Jan. 20, 1948.　　　　R. D. JUNKINS ET AL　　　　2,434,854

TUBE CONTROLLED WORK AND FEED MOTOR SYSTEM

Filed Dec. 4, 1943　　　　3 Sheets-Sheet 1

Inventors
RAYMOND D. JUNKINS
AND ANTHONY J. HORNFECK

By Raymond D. Junkins
Attorney

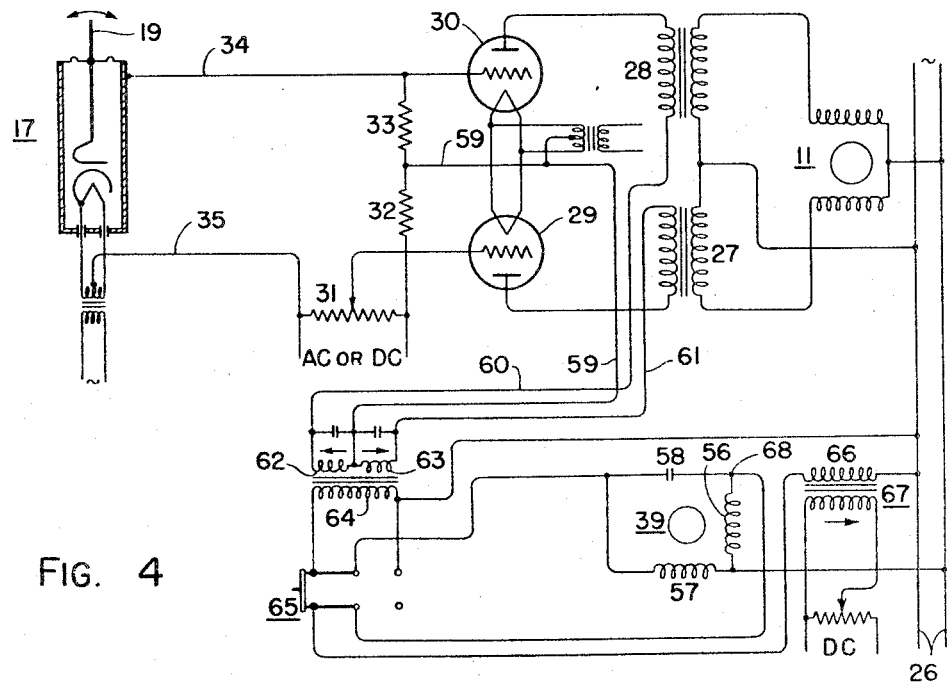
FIG. 4
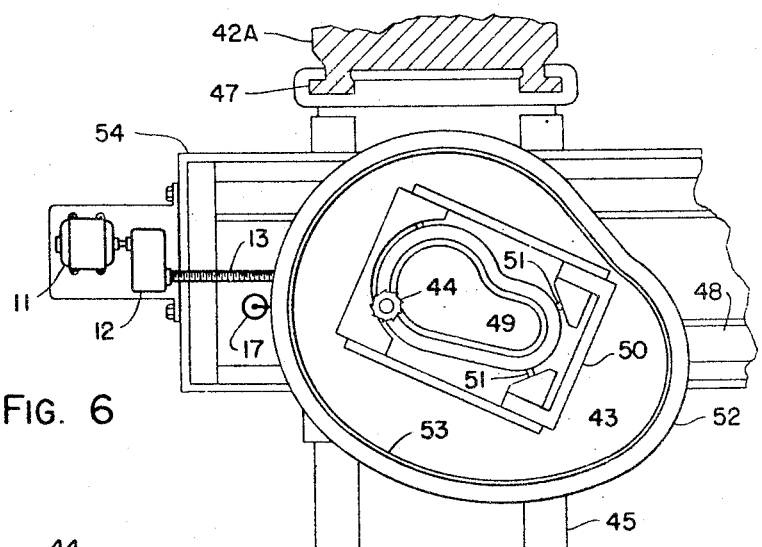
FIG. 6
FIG. 7
Inventors
RAYMOND D. JUNKINS
AND ANTHONY J. HORNFECK
By Raymond D. Junkins
Attorney Patented Jan. 20, 1948

2,434,854

UNITED STATES PATENT OFFICE 2,434,854

TUBE CONTROLLED WORK AND FEED MOTOR SYSTEM

Raymond D. Junkins and Anthony J. Hornfeck, Cleveland Heights, Ohio, assignors to Bailey Meter Company, a corporation of Delaware Application December 4, 1943, Serial No. 512,854

3 Claims. (Cl. 318—39)

This invention relates to contour control or duplicators, as they are sometimes called, for machine tools such as lathes, shapers, planers, milling machines, die sinking machines and the like.

An object of our invention is to provide a contour control wherein a desired contour or shape is accurately produced on a work piece, thereafter requiring a minimum of hand finishing.

Still another object of our invention is to provide a contour control or duplicator which may be readily applied to a wide variety of machine tools.

Another object of our invention is to provide a duplicator wherein the linear cutting speed of the tool relative to the work is maintained constant or varied in predetermined manner.

Further objects will be apparent from the description and drawings in which:

Fig. 4 is an electric circuit diagram of what we term a 2-element contour control for a lathe.

Fig. 6 illustrates our invention as applied to a milling machine.

Fig. 7 is a partial elevation of Fig. 6.

As is well understood by those familiar with the art, in some machine tools, such as lathes, the tool is moved longitudinally and transversely of the work piece, which except for rotation about its center remains stationary. In other machine tools, such as some types of milling machines, the work piece may be moved in two directions, while the tool except for rotation about its axis remains stationary. In some other types of milling machines and in some die sinking machines the tool may be moved in one, two or three directions and the work piece also may be moved in one or more directions. In all instances it will be observed, however, that it is the relative movement between the tool and work piece that causes the work piece to be formed to a desired shape. As one specific embodiment of our invention we have chosen to illustrate and describe our invention incorporated in a lathe, wherein the work piece, except for rotation about its center, remains stationary and the tool is moved transversely and longitudinally thereof. As another specific embodiment of our invention we have illustrated our invention applied to a milling machine wherein the tool, except for rotation about its center, remains stationary and the work piece is moved in two directions in order that the tool may cut the work piece to a desired shape. It will thus be evident that our invention is applicable to a wide variety of machine tools, and that when we speak of relative movement between the tool and work piece we include either an arrangement where the tool is stationary and the work piece moves, or the work piece is stationary and the tool is moved, or a combination of the two.

Figure 1:
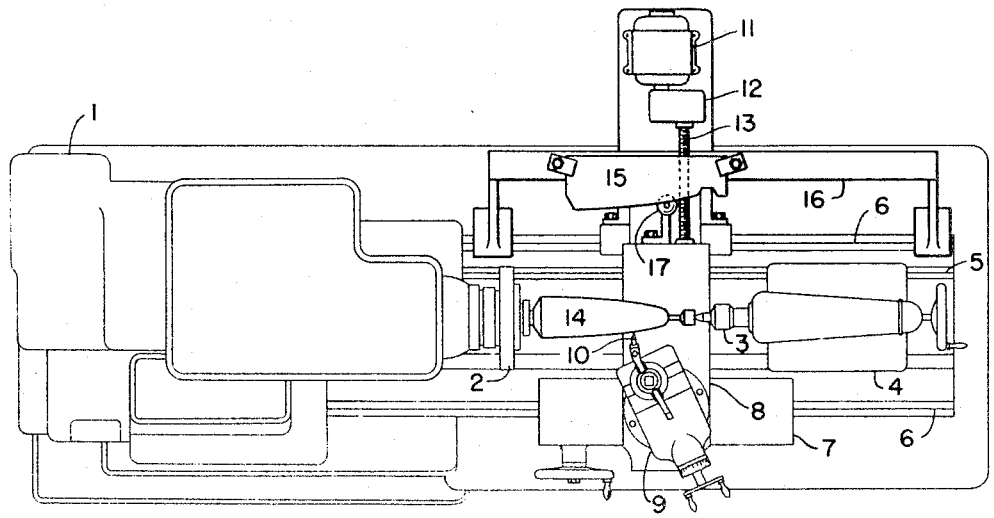
Fig. 1 is a plan view of an engine lathe illustrating an application of our invention thereto.

Referring to Fig. 1, we show our invention applied to an engine lathe 1 having a head stock 2 adapted to be rotated at desired speed by any suitable means (not shown) a tail stock 3. A carriage 4 moves longitudinally along the bed of the lathe in suitable ways 5 and supports the tail stock 3. Also movable longitudinally along the bed of the lathe in suitable ways 6 is a carriage 7. Mounted on the carriage 7 is a cross-slide 8, movable on ways transversely of the bed of the lathe.

The cross-slide 8 is provided with an adjustable tool support 9 in which is secured a tool 10. Transverse movements of the tool 10 are produced by means of an electric motor 11 driving through the necessary gear reduction 12 a worm or screw 13 for positioning the cross-slide 8 transversely of the bed of the lathe. Longitudinal movements of the tool 10, that is movements of the tool parallel to the bed of the lathe, are produced by means of the regular lead screw where uniform longitudinal speed of the tool is desired and by means of our invention as later described when variable longitudinal speed is desired.

Supported by the head stock 2 and tail stock 3 is a work piece 14 which for illustrative purposes is shown as being formed to a parabolic shape by the tool 10. The particular shape has no significance, it being apparent as the description proceeds that by our invention a work piece may be formed automatically to any desired contour. A master template or cam 15 is rigidly held in parallelism to the work piece 14 upon any convenient extension 16 of the lathe bed. The profile of the master 15 is the contour which it is desired to reproduce upon the work piece 14. In Fig. 1 the taper of the work piece 14 follows in general a parabolic function merely as an example. For contacting and following the profile of the master 15 we provide a tracer assembly 17 rigidly mounted on and movable with the cross-slide 8. The assembly 17 is shown in larger diagrammatic fashion in Fig. 2 as having a body member or envelope 18 which is firmly mounted to the cross slide 8 and a tracer arm 19 carried by a flexible diaphragm 20 forming a part of the enclosure 18.

The tracer assembly 17 constitutes an electron discharge device, preferably a two-element tube having a movable anode 21 and a heated cathode 22. The envelope 18, of which the diaphragm 20 forms a part, may be of metal or of glass, but preferably of metal for strength. It is preferably of such shape and construction that the diaphragm 20 will flex to allow movement of the anode 21 within the envelope 18 as a result of positioning the member 19 through means external to the envelope, such as engagement of the tracer arm 19 with the edge of the master template 15.

Such an electron discharge device or tube is preferably a high vacuum tube of the regulating type, wherein the effective electron emitting or electron receiving areas of the electrodes are varied without necessarily changing the distance between the electrodes as shown and described in the patent to McArthur, 2,142,857. As shown in the drawings, movement of the anode 21 relative to the cathode 22 causes a change in magnitude of the electric current which flows through the tube, and while the tube is not of the start-stop grid control type, nevertheless movement of the anode away from the cathode in sufficient extent may reduce the current passage to zero.

Figure 2:
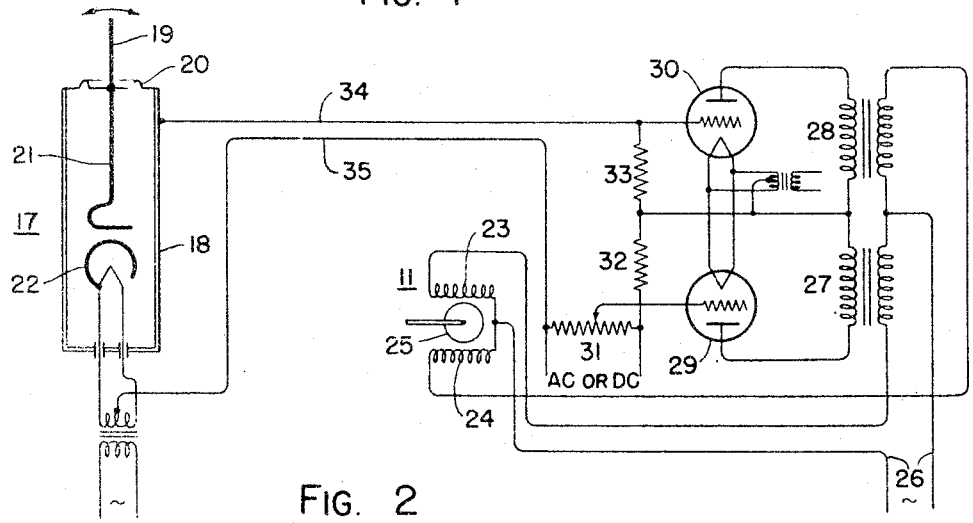
Fig. 2 is an electric circuit diagram of our contour control embodied in the lathe of Fig. 1.

In Fig. 2 we have not only shown the tracer assembly 17 to larger diagrammatic scale, but have shown the complete electrical circuit for controlling the motor 11 by the tracer 19 in such manner that the motor 11 will position the cross-slide 8 and consequently the tool 10 transversely of the lathe, or in other words toward or away from the work piece 14 as the tool 10 is traveling longitudinally. The action is such that if the contacted edge of the master cam 15 is a straight line parallel to the axis of the work piece 14, then the work piece 14 would be turned to cylindrical form. If the contacted edge of the master 15 is a straight line, but inclined relative to the axis of the work piece 14, then the work piece 14 will be shaped with a taper. The particular showing of Fig. 1 is in general a parabolic curve on the contacted edge of the master 15, and thus the form to be produced on the work piece 14.

The motor 11 has field windings 23, 24 connected in an alternating current circuit and oppositely wound in a manner such that when the windings 23 and 24 are equally energized the rotor 25 is not urged to rotation in either direction, but when the windinges are unequally energized rotation of the rotor 25 will occur in predetermined direction and at a speed dependent upon the unbalance of energization of the windings. The rotor 25 is connected by means of gears 12 to rotate the screw 13 and position the cross slide 8 transversely of the lathe.

The field windings 23, 24 are connected in parallel across an alternating current power source 26; and differentially in the primary circuit of transformers 27, 28 respectively; the current flow for energization of 23, 24 being controlled by varying the impedance of the primaries upon variation in the current flow through the related secondaries. The secondaries are connected respectively in circuit with motor control tubes 29, 30 and the arrangement is such that if one of the tubes 29, 30 is passing current and the other is not passing current, then one of the field coils 23, 24 is energized and the other is deenergized, so that the rotor 25 is caused to rotate continuously at maximum speed in a given direction. If, however, both the tubes 29, 30 are passing current in equal amounts, then the field windings 23, 24 are energized in equal amounts and the rotor 25 is not urged to rotation in either direction. The latter is a condition which exists when the contact edge of the master template 15 is parallel to the axis of the work piece 14 and the tracer arm 19 is in what may be termed a neutral position. Immediately upon the tracer arm 19 (as it travels longitudinally of the lathe) finding that the contact edge of the template 15 deviates from parallelism with the axis of the work piece 14 the tracer arm 19 is deflected in one direction or the other, thus moving the anode 21 relative to the cathode 22 and causing an unbalance of electrical conditions wherein one of the field coils 23, 24 is energized to a greater extent than the other, and the rotor 25 is caused to rotate in predetermined direction and at a speed dependent upon the amount of unbalance of the field coil energization.

The output of the tubes 29, 30 is controlled by a circuit including the grids respectively of said tubes as well as including the electron discharge device 17 whose anode is positioned relative to its cathode by movements of the tracer arm 19. A voltage divider 31, as well as resistances 32, 33, are provided in the control circuit. If there is no current flow through the device 17, the tube 30 passes current and the tube 29 does not. When a maximum current flows through the device 17, then the tube 29 passes current, but the tube 30 does not. At all intermediate values of current flow through the device 17 the two tubes 29, 30 pass proportionate amounts of current and proportionally or differentially vary the impedance of the secondaries of transformers 27, 28, resulting in a corresponding variation in energization of the field windings 23, 24, and if the energization of the windings is unbalanced, then rotation of the rotor 25 is in predetermined direction and at a predetermined speed, dependent upon the amount of unbalance. The device 17 is connected to the motor control circuit by conductors 34, 35, the former of which is connected to the envelope and anode 21. The conductor 35 is a tap from the heating transformer for the cathode 22. The leads from the cathode to its heating transformer are obviously to be insulated as they pass through the metallic envelope 18.

It will be observed that when the anode of the device 17 is in a predetermined position relative to its cathode there will exist a condition of equal current flow through the primaries of the transformers 27, 28, through the secondaries, and through the windings 23, 24 of the motor 11, and that the rotor 25 will not be urged to rotation in either direction. Immediately upon a change in anode-cathode relation as produced by a change in the position of the tracer arm 19, the anode 21 will be moved relative to the cathode 22, thus increasing or decreasing the current flow through the device 17 and unbalancing the current flow through the tubes 29, 30 and correspondingly through the field windings 23, 24, so that the rotor 25 will be caused to rotate in predetermined direction and at a speed dependent upon the amount of movement of the tracer arm 19.

Such rotation of the rotor 25 will be in a direction to move the cross-slide 8 toward or away from the master template 15. Such movement of the cross-slide 8 carries the tracer arm 19 properly toward or away from the edge of the cam 16, thereby returning the anode 21 to its neutral or normal position relative to the cathode 22. At the same time such movement of the cross-slide 8 will position the cutting tool 10 relative to the work piece 14 for shaping the same to conform with the contact edge of the master template 15.

Figure 3:
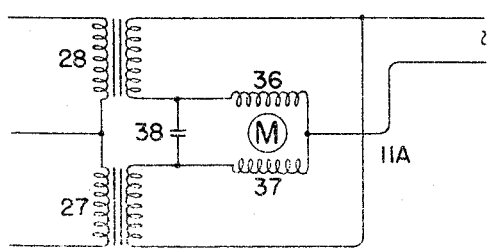
Fig. 3 is an electric circuit for a different type of motor.

In Fig. 3 we show a portion of the electric circuit of Fig. 2 as adapted to control a capacitor-run alternating current motor 11A for positioning the screw 13. The motor 11A has a rotor and has stator windings 36, 37, the latter constituting running coils electrically ninety degrees apart. The motor is provided with a capacitor or condenser 38 which when the motor is rotating is in series with either the winding 36 or the winding 37, depending upon desired direction of rotation. Such a motor runs as a two-phase alternating current motor and not only may be reversed as to direction of rotation but is susceptible of speed control when rotating in either direction. When the output of the transformers 27, 28 is equal the rotor does not rotate, but upon an unbalance in output of the transformers 27, 28 the rotor rotates in predetermined direction and at a speed depending upon the extent of the unbalance of output of the transformers.

We have illustrated and described two distinct types of alternating current motors for positioning the cross-slide 8, but it will be understood that known circuit arrangements between the device 17 and the motor may be used for directional and speed control of a large variety of both alternating current or direct current motors. Thus the motors 11 and 11A are illustrative only and the invention is not limited to either of the particular types of motors described.

So far we have illustrated and described our invention in connection with what we term a single element control for a lathe, namely, a control of the transverse movement of the tool 10; while the tool is moved at a uniform speed longitudinally of the work through the agency of the usual lead screw. A further adaptation of our invention embodies a two-element control wherein we additionally control the longitudinal movement of the tool through the agency of the tracer arm 19.

Fig. 4 is a wiring diagram of such a 2-element control wherein the electric circuit including the device 17 and the motor 11 duplicates the electric circuit of Fig. 2. As in Fig. 1 the electric motor 11 is arranged to position the tool 10 transversely relative to the work piece 14.

For positioning the cross-slide 8, as well as the tool 10, in a longitudinal direction parallel to the axis of the work piece 14 we provide an electric motor 39 which is illustrated in Fig. 4 as a capacitor-run alternating current motor having two windings 56, 57 electrically ninety degrees apart and a capacitor 58. When current flow is directly through one of the windings 56 or 57 and simultaneously through the other winding in series with the capacitor 58 the motor rotates in desired direction.

The arrangement is such that normally the motor 39 rotates in but a single direction but at a variable or controllable speed. Normally, the longitudinal travel of the tool 10 is from right to left facing the drawing of Fig. 1 and at what may be termed a normal speed. If the transverse motor 11 rotates in either direction, thus positioning the tool 10 either toward or away from the axis of the work piece 14, then the speed of rotation of the motor 39, and consequently the speed of longitudinal travel of the tool 10, is decreased. This proceeds to a limit wherein if the transverse movement of the tool 10 is directly toward or away from the axis of the work piece 14 (as dictated by the cam or template 15) then under this condition the motor 39 would not rotate and the tool would not travel longitudinally relative to the work piece until the direct transverse motion of the tool had been accomplished. In this way direct ninety degree shoulders are produced on the work piece 14.

We show in Fig. 4 an electric circuit for control of the motor 39 such that it normally rotates in but a single direction and at what may be termed a normal speed when the motor 11 is not rotating; in other words, when the output of the transformers 27, 28 is balanced. If the motor 11 begins to rotate in one or the other of its two directions then the speed of rotation of the motor 39 is decreased. When the motor 11 is rotating at its maximum speed in either direction the motor 39 is stopped.

The conductor 59 joins the common terminal of the resistances 32, 33 with the common terminal of the transformer secondaries 27, 28 in Fig. 2. In Fig. 4 we show interposed between the transformer secondaries 27, 28 direct current saturating windings 62, 63 whose common terminal is joined to the conductor 59. These saturating windings 62, 63 are bridged by condensers and are so arranged as to be oppositely effective in saturating the core of a saturable core reactor having an alternating current output winding 64.

In Fig. 4 we have illustrated a double-pole double-throw switch 65 which under normal operating conditions is in the position illustrated. One pole of said switch joins the alternating current output winding 66 of a saturable core reactor 67 with the terminal 68 of the motor 39.

If the profile of the pattern 15 is parallel to the axis of the work piece 14 then the tracer arm 19 is in its normal position, the tubes 29, 30 pass equal amounts of current, the impedance of the transformers 27, 28 is equal, and the motor 11 is stationary. Under such condition it is desired that the motor 39 be operating in its normal direction at its normal speed. The saturating effect of the winding 62, 63 is equal and in opposite direction, thus permitting a minimum flow of alternating current through the output winding 64 and the motor 39 in opposition to the constant bias effect of the reactor 67.

Upon movement of the tracer arm 19 in either direction from a normal position the current flow through the transformer secondaries 27, 28 is unbalanced and unbalancing the direct current saturating effect of the winding 62, 63. It is immaterial as to whether 62 or 63 predominates as regardless of the direction of predominance it is the difference between the two which provides an increasing saturating effect upon the reactor and an increasing passage of alternating current through the output winding 64 in opposition to the constant value of alternating current passing through the output winding 66 of the bias reactor 67. As the transformers 27, 28 continue to a maximum of unbalance, corresponding to maximum speed of the motor 11 in one direction or the other, the alternating current flow through the winding 64 opposes that through the winding 66 until they reach a value of equality wherein the motor 39 ceases to rotate. In order that there may be no possibility of the motor 39 reversing its direction of rotation the value of the bias current through 66 is slightly greater than that ever attained through the winding 64. Theoretically, the motor 39 will not cease rotating, but practically its speed of rotation diminishes to a point where friction and load actually stop rotation.

It will thus be clear that the motor 39 normally rotates in but a single direction and at a speed from normal varied downward to zero, dependent upon the increase in speed of rotation of the motor 11 and independent of the direction of rotation of the motor 11.

In order that a rapid return of the tool 10 from left to right may be accomplished at maximum rotating speed of the longitudinal travel lead screw in proper direction, we provide the switch 65 which when thrown in position opposite to that shown in Fig. 4 properly connects the windings 56, 57 and the capacitor 58 directly across the power source 26 so that the direction of rotation of the motor 39 is reversed.

Figure 8:
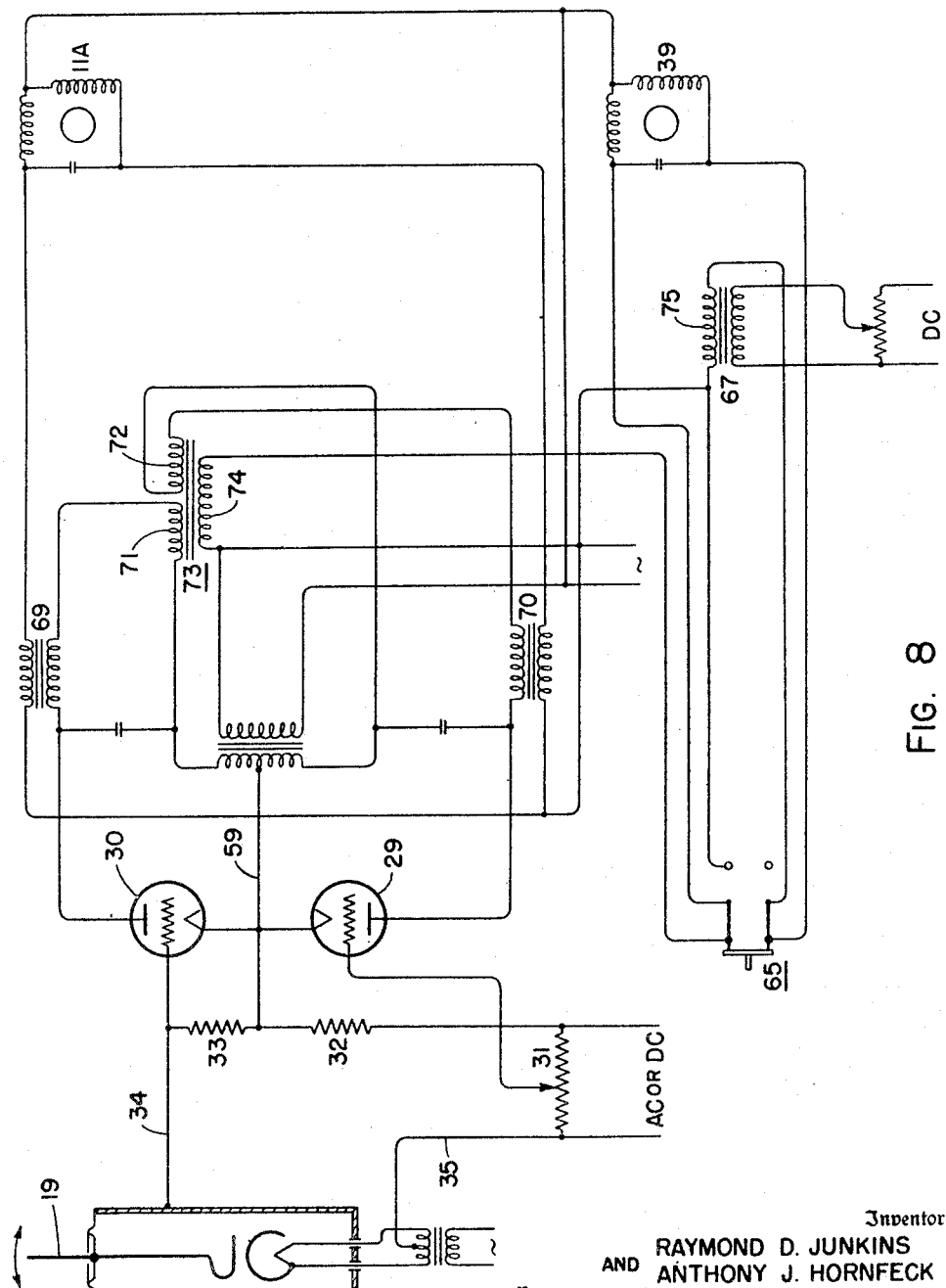
Fig. 8 is a wiring diagram similar to Fig. 4.

In Fig. 8 we show an electric circuit similar to that of Fig. 4 except that we here utilize two capacitor-run alternating current motors, namely, 11A for the transverse speed of the tool 10 and 39 for the longitudinal travel. A pair of saturable core reactors 69, 70 control the direction and speed of rotation of the motor 11A. Saturating windings for the reactors 69, 70 are included in the output circuits of the devices 29, 30, as well as saturating windings 71 and 72 of a saturable core reactor 73 having an alternating current output winding 74. In general, the saturating windings 71, 72 are similar to the windings 62, 63 of Fig. 4.

Unbalance of saturable core reactors 69, 70 produces rotation of motor 11A in proper direction and at a speed dependent upon the amount of unbalance of said reactors. Simultaneously the motor 39, rotating in a single direction, has its speed varied downwardly or inversely to the speed of rotation of the motor 11A.

For certain operations it may be desirable to provide a 3-element control of the lathe, namely, to include with the control of transverse and longitudinal movement of the tool a control of speed of rotation of the work piece relative to the tool. This so that cutting speed of the tool may be held constant, i. e., the speed of rotation of the work when cutting at one diameter to be proportionally greater or lesser than the speed of rotation when cutting at a different diameter. To accomplish such control we provide for rotating the work piece 14 through the necessary gears by means of a motor similar to the motor 39 and controlled in similar manner insofar as unitary directional rotation is concerned. In other words, the motor would rotate normally in a single direction, but its speed of rotation would depend upon the transverse position of the tool 10, and consequently upon the diameter of the work piece at which the tool were cutting.

Figure 5:
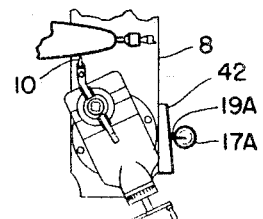
Fig. 5 shows a modification of a part of the lathe of Fig. 1.

For dictating to the motor control circuit the transverse position of the tool 10 we provide a cam 42, Fig. 5, fastened to and carried by the cross-slide 8 in its transverse positioning relative to the work piece 14. Fixed to the carriage 7 is a tracer device 17A having its contact arm 19A engaging the profile of the cam 42. Thus as the cross-slide 8 is positioned toward or away from the axis of the work piece 14 the cam surface 42 would engage in greater or lesser extent the tracer arm 19A for control of speed of rotation of the motor rotating the work piece.

Referring now to Fig. 6, we therein show a view looking down on a vertical milling machine having a column 42A, a work table 43 and a rotatable form milling cutter 44. The work table 43 is carried in a saddle 54 mounted on horizontal guideways 45 carried by a knee 46, which is supported in vertical guideways 47 formed on the column 42A. The cutter 44, while rotating, is normally in fixed axial position. The work table 43 rotates and is movable horizontally along the guideways 48.

At 49 is shown a typical work piece consisting of a concave forging of more or less elliptical shape and in rough form having a raised blank face extending around its entire periphery. The machining operation which we have chosen as illustrating our invention includes forming a male flange face on this blank face. The cutter 44 is suitably shaped to relieve the outer edge of the flange, and by our invention the work piece is automatically moved along the guideways 48, relative to the cutter 44, so that the latter accurately forms the outer profile of the raised portion of the flange.

The work piece 49 is shown as being secured to a fixture 50 by adjustable clamping means 51. Because of the nature of the machining operation to be performed the fixture 50 is secured to the work table 43 and rotatable at desired speed by a motor which may be similar to motor 39 and controlled in the manner described in connection therewith. In other words, the rotation of the table 43 may be at a variable speed dependent upon the particular shape of the contour to be produced. The machining of the work piece 49 is completed in one revolution of the table 43; during the revolution of the work piece being moved relative to the cutter 44 to accurately profile the male flange by means now to be described.

The fixture 50 has a horizontally extending skirt 52 forming a cam or template, the contour of which is formed to produce the desired contour of the raised portion of the flange on the work piece 49. A raised barrier 53 is preferably employed to hold chips cut from the work piece from scattering.

Supported by the saddle 54 is the tracer element 17 having its tracer arm 19 engaging the periphery of the cam 52. The device 17 controls the motor 11, which drives through gears 12 to the lead screw 13 for horizontally positioning the work table 43 along the guides 48 on the saddle 54.

Through engagement of the tracer arm 19 with the periphery of the cam 52 the motor 11 is energized to position the work table 43 carrying the work 49 and cam 52 to the right or left along the ways 48 relative to the stationary milling cutter 44.

In Fig. 7 we show an elevation of a portion of the milling machine of Fig. 6. We provide a second cam or template 55 rotatable with the work table 43, the work 49 and the cam 52. Engaging the cam 55 is the contact arm of a tracer 17B mounted on the non-rotatable portion of the work table 43. The tracer 17B is, however, movable along the ways 48 of the saddle 54 with the rotatable and the non-rotatable portion of the work table.

A motor for rotating the rotatable portion of the work table 43 is movable along the ways 48 with the entire work table assembly. Such motor is controlled by the tracer 17B in engagement with the cam 55 and functions to provide a speed of rotation of the work piece dependent upon the cam profile 55.

In general, the arrangement is such that the cam 52 provides for transverse movement of the work 49 relative to the cutter 44 and while the work 49 is making one complete revolution. The cam 55 functions to determine the speed of rotation of the work piece 49 relative to the cutter 44 during the single revolution of the work piece. The motors under the control of the tracer 17 and the tracer 17B may be of the type described, and controlled as described.

While we have chosen to describe certain preferred embodiments of our invention, namely, in connection with a lathe or a milling machine, it will be understood that we are not to be limited thereto, but that our invention is equally applicable to any material forming machine where it is desired to shape a work piece to the configuration of a master cam or template by relatively moving the tool or work piece.

What we claim as new and desire to secure by Letters Patent of the United States is:

1. Apparatus for relatively moving a tool and a work medium to cause relative movement in one direction only along one coordinate and in either of opposite directions along another, comprising a variable speed electric motor arranged to relatively move said tool unidirectionally along the first coordinate at a normal speed, a reversible variable speed electric motor arranged to relatively move said tool along the second coordinate, a pattern for designating the path of the tool, electronic means for following said pattern and including relatively movable electrodes adapted to change the output when moved, a network controlled by said electronic means for determining the rate and direction of movement of the second motor dependent upon change of output in opposite directions from normal, said network including oppositely connected amplifying tubes, means responsive to the difference in output of said tubes and hence in the speed of the second motor in either direction to regulate the difference in speed of the first motor from said normal, and means to effect relative movement of the electronic means and said pattern, said last mentioned means being actuated with said tool.

2. A control means for relatively movable parts of a machine, motive means for providing said relative motion, said motive means including a first and a second variable speed electric motor arranged to provide said relative movement along first and second paths, respectively, tracer control means including pattern means and electric tracer means therefor, means for providing a fixed relationship between said pattern means and one of said parts, means for providing a fixed relationship between said electric tracer means and another of said parts, said electric tracer means having two parts adapted to have a variable current flow therebetween, a network for determining the speed of the first motor and the speed and direction of the second motor, said second motor having first and second fields each with first and second ends, said network including a voltage supply source for said motors, means for connecting said first ends of said fields to one side of the voltage supply source, first and second thermionic tubes each having first and second electrodes, common interconnecting means for interconnecting said first electrodes, output circuit means including variable impedance means for connecting said interconnected first electrodes to each of said second electrodes, first circuit means for connecting said electric tracer means to said network for varying the differential output of said tubes, second circuit means for connecting said output circuit means between the other side of said voltage supply source and said second ends of said fields whereby the differential output governs the speed and rotational direction of said second motor, and third circuit means for connecting said variable impedance means between said voltage supply source and said first motor for governing the speed of said first motor in accordance wtih the imepdance of said variable impedance means.

3. A control means for relatively movable parts of a machine, motive means for providing said relative motion, said motive means including a first and a second variable speed electric motor arranged to provide said relative movement along first and second paths, respectively, tracer control means including pattern means and electric tracer means therefor, means for providing a fixed relationship between said pattern means and one of said parts, means for providing a fixed relationship between said electric tracer means and another of said parts, said electric tracer means having two parts adapted to have a variable current flow therebetween, a network for determining the speed of the first motor and the speed and direction of the second motor, said second motor having first and second fields each with first and second ends, said network including a voltage supply source for said motors, means for connecting said first ends of said fields to one side of the voltage supply source, first and second thermionic tubes each having first and second electrodes, common interconnecting means for interconnecting said first electrodes, output circuit means including a saturable core reactor for connecting said interconnected first electrodes to each of said second electrodes, first circuit means for connecting said electric tracer means to said network for varying the differential output of said tubes, second circuit means for connecting said output circuit means between the other side of said voltage supply source and said second ends of said fields whereby the differential output governs the speed and rotational direction of said second motor, and third circuit means for connecting said saturable reactor between said voltage supply source and said first motor for governing the speed of said first motor in accordance with the degree of saturation of said saturable reactor.

RAYMOND D. JUNKINS.
ANTHONY J. HORNFECK.

REFERENCES CITED

The following references are of record in the file of this patent:

UNITED STATES PATENTS

| Number | Name | Date |
|---|---|---|
| 1,301,966 | Parkhurst et al. | Apr. 29, 1919 |
| 1,936,922 | Sukumlyn | Nov. 28, 1933 |
| 2,025,748 | Howe | Dec. 31, 1935 |
| 2,086,153 | Beckel | July 6, 1937 |
| 2,092,142 | Schuz | Sept. 7, 1937 |
| 2,112,682 | Ryder | Mar. 29, 1938 |
| 2,116,593 | Bouvier et al. | May 10, 1938 |
| 2,150,032 | Herman et al. | Mar. 7, 1939 |
| 2,151,743 | Chladek | Mar. 28, 1939 |
| 2,228,902 | Allen | Jan. 14, 1941 |
| 2,310,955 | Hornfeck | Feb. 16, 1943 |
| 2,331,698 | Keeler | Oct. 12, 1943 |
| 2,340,060 | King et al. | Jan. 25, 1944 |
| 2,259,472 | Johnson | Oct. 21, 1941 |
| 2,290,531 | Brett | July 21, 1942 |